United States Patent
Kragh (10) Patent No.: US 6,361,426 B1
(45) Date of Patent: Mar. 26, 2002

(54) FISH PROCESSING MACHINE WITH A FISH MEAT RECOVERY UNIT AND METHODS FOR EXTRACTING ADDITIONAL MEAT FROM A WASTE BODY PART OF A FISH

(75) Inventor: Henrik Kragh, Issaquah, WA (US)

(73) Assignee: American Seafoods Company, Seattle, WA (US)

( * ) Notice: Subject to any disclaimer, the term of this patent is extended or adjusted under 35 U.S.C. 154(b) by 0 days.

(21) Appl. No.: 09/492,937

(22) Filed: Jan. 27, 2000

(51) Int. Cl.⁷ .................................................. A22B 26/16

(52) U.S. Cl. ..................... 452/161; 452/64; 452/157; 452/170; 452/182

(58) Field of Search .................... 452/64, 152, 157, 452/160, 161, 162, 163, 170, 182, 183

(56) References Cited

U.S. PATENT DOCUMENTS

| | | | | |
|---|---|---|---|---|
| 3,670,363 A | * | 6/1972 | Hogan et al. | 452/64 |
| 4,551,885 A | * | 11/1985 | Molnar | 452/182 |
| 4,800,626 A | * | 1/1989 | Wastell | 452/183 |
| 5,106,334 A | * | 4/1992 | Kristinsson | 452/160 |
| 5,135,432 A | * | 8/1992 | Kristinsson | 452/160 |
| 5,226,848 A | * | 7/1993 | Sigurdsson | 452/160 |
| 5,554,069 A | * | 9/1996 | Burch et al. | 452/162 |

FOREIGN PATENT DOCUMENTS

| | | | | |
|---|---|---|---|---|
| DE | 1 292 819 | * | 4/1969 | 452/162 |
| SU | 48205 | * | 5/1982 | 452/64 |
| SU | 0921-493 | * | 4/1992 | 452/64 |

OTHER PUBLICATIONS

Whitefish Filleting Maching with Integrated Roe Extractor; BAADER 212 Food Processing Machinery Nordischer Maschinenbau Rud. Baader GmbH+Co. KG Germany; Feb., 1993.

* cited by examiner

Primary Examiner—Willis Little
(74) Attorney, Agent, or Firm—Perkins Coie LLP (57) ABSTRACT

Apparatuses and methods for processing meat from waste body parts of fish. In one embodiment, a fish processing machine includes a primary processing line and a reclamation processing line. The primary processing line can include a first conveyor system to transport a fish trunk along a primary processing path, a first cutter at a first location along the primary processing path configured to separate a waste body part from the fish trunk, and a second cutter at a second location along the primary processing path downstream from the first cutter. The second cutter has at least one knife arranged to slice high-value meat from the trunk. The reclamation processing line is coupled to the primary processing line. The reclamation processing line can include a recovery cutter to separate an additional meat portion from the waste body part and a transfer mechanism to automatically transport the waste body part to the recovery cutter without manually manipulating the body part. The recovery cutter generally has at least one cutting blade in a cutting zone relative to a reclamation processing path, and more preferably has two blades at angle to one another. The cutting blades slice the additional meat portion from the waste body part. The transfer mechanism can comprise a receiving station proximate to the first location of the primary processing line to receive the separated waste body part, a support surface configured to orient the separated waste body part so that the additional meat portion is in the cutting zone, and a delivery station proximate to the recovery cutter to deliver the meat portion of the waste body part to the recovery cutter.

38 Claims, 5 Drawing Sheets

FISH PROCESSING MACHINE WITH A FISH MEAT RECOVERY UNIT AND METHODS FOR EXTRACTING ADDITIONAL MEAT FROM A WASTE BODY PART OF A FISH

TECHNICAL FIELD

The present invention relates to commercial fish processing operations, and more particularly to extracting high-value fish meat from waste body parts that are normally used for fish meal.

BACKGROUND OF THE INVENTION

Commercial fish processing operations commonly process, package and freeze fish on marine vessels immediately after harvesting the fish. Typical commercial processing vessels cut and grind pollock, hake and other types of fish into fillets, surimi and fish meal. Many commercial processing vessels have several decks with equipment to sort, process, package and store the fillets, surimi and fish meal.

Commercial processing vessels typically have a processing deck where fish are sorted into size categories to run through either a fillet process line or a surimi process line. In the surimi process line, fillets from small fish are ground, washed, dewatered and pressed/extruded into a fish paste that is formed into a freezer block. The fillets and the surimi are then packaged and frozen in a freezing hold on a separate deck.

The fillet line and the surimi line produce fish waste products from waste body parts, such as bones, tails, heads and organs. The waste body parts are separately processed into fish meal for use in a variety of different products. Fish meal is a low value product compared to fillets and surimi. Therefore, fillets and surimi are generally much more profitable products.

One difficulty currently facing commercial fish processors is that many governments are setting quotas and increasing regulations on the amount and type of fish that can be harvested. For example, certain harvesting grounds are open for only a limited period of time, or the harvest of certain species of fish is limited to a maximum tonnage. Thus, to be more competitive, commercial fish processors are seeking procedures and equipment to increase the yield of fillets, surimi and other higher value products from each fish.

SUMMARY OF THE INVENTION

The present invention is directed toward methods and machines for extracting additional high-value fish meat from a waste body part of a fish. In one embodiment, a fish processing machine includes a primary processing line and a reclamation processing line. The primary processing line can include a conveyor system to transport a fish trunk along a primary processing path, a first cutter at a first location along the primary processing path configured to separate a waste body part from the fish trunk, and a second cutter at a second location along the primary processing path downstream from the first cutter. The second cutter has at least one knife arranged to slice high-value meat from the trunk.

The reclamation line is coupled to the primary line. The reclamation line can include a recovery cutter or a reclamation cutter to separate an additional high-value meat portion from the waste body part, and a transfer mechanism to automatically transport the waste body part from the primary line to the recovery cutter without manually manipulating the body part. The recovery cutter can comprise at least one cutting blade, and more preferably includes at least two cutting blades, in a cutting zone relative to a reclamation processing path. The cutting blade slices the additional meat portion from the waste body part. The transfer mechanism can comprise a receiving station proximate to the first location of the primary line to receive the separated waste body part, a support surface configured to orient the separated waste body part so that the additional meat portion is in the cutting zone, and a delivery station proximate to the recovery cutter to deliver the meat portion of the waste body part to the recovery cutter.

In operation, the waste body part is separated from the trunk of the fish in the primary line. The trunk of the fish continues in the primary line and is processed to produce fillets, surimi or other high-value fish products. The waste body part, such as a head, is automatically transported from the primary line to the reclamation line without manually manipulating the waste body part. The transfer mechanism delivers the waste body part to the recovery cutter along the reclamation processing path so that an additional meat portion on the waste body part engages the cutting blade of the recovery cutter. The cutting blade separates the additional meat portion from the waste body part. The additional meat portion can then be sent to a surimi line to be processed into high-value surimi, and the remaining portion of the waste body part can be transported to a fish meal processing station. Therefore, one embodiment of the invention extracts or reclaims additional meat from waste body parts that would have otherwise been turned into fish meal.

DETAILED DESCRIPTION

The present invention is directed toward methods and machines for recovering high-value meat from fish waste products. Several specific details of the invention are set forth in the following description and in FIGS. 1–7 to provide a thorough understanding of particular embodiments of the invention. The following description also provides examples of the preferred embodiments. One skilled in the art, however, will understand that the present invention may have additional embodiments, or that other embodiments of the invention may be practiced without several of the specific features explained in the following description.

Figure 1:
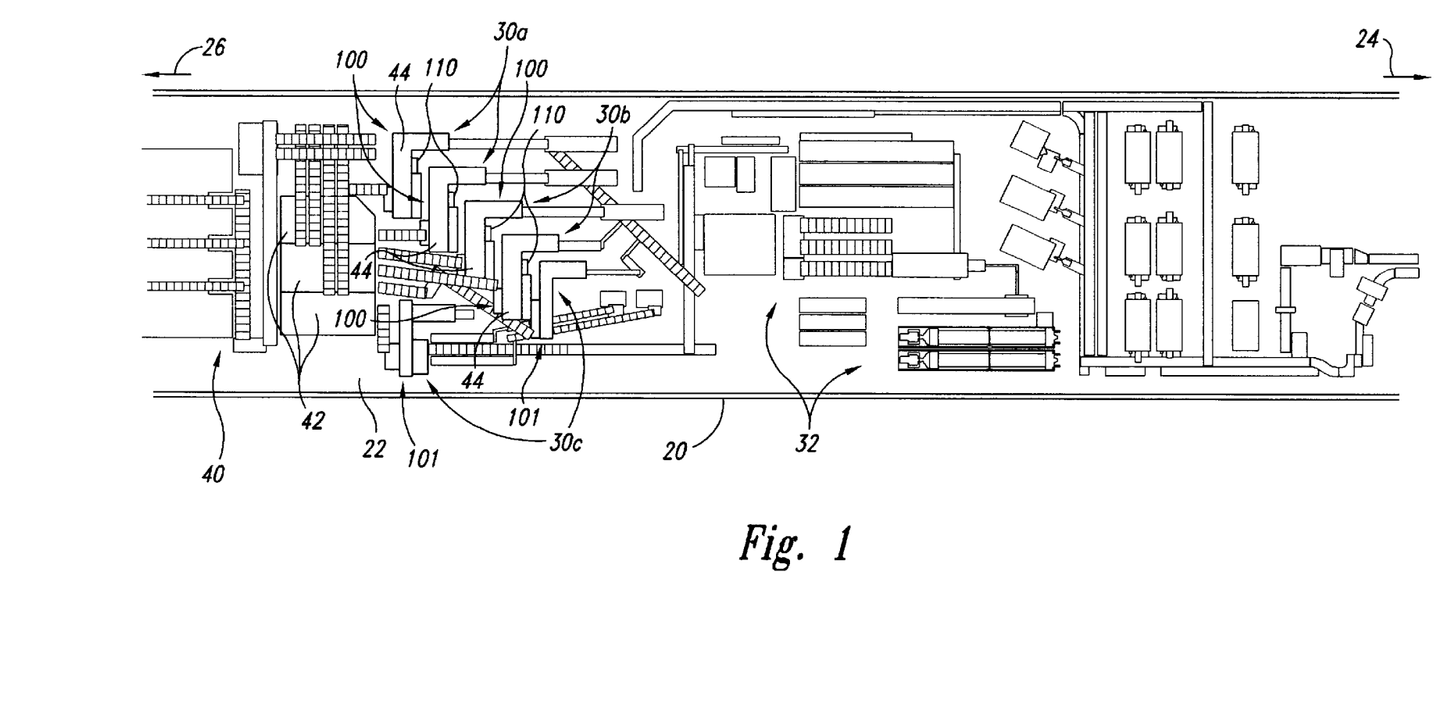
FIG. 1 is a top plan view of a processing deck in a marine vessel including fish processing machines with recovery apparatuses in accordance with an embodiment of the invention.

FIG. 1 is top plan view partially illustrating a marine vessel 20 having a process deck 22 extending from approximately the bow 24 to the stern 26. The process deck 22 includes a fillet process line 30 (identified by reference numbers 30a–30c) and a surimi process line 32. The process deck 22 can also include a fish meal processing station. The processing deck 22 also has a sorting area 40 where large, medium and small fish are sorted and sent to holding tanks 42. The fillet line 30 also includes a plurality of processing machines 100 to fillet and extract additional meat from the fish. The fillet line 30, for example, can include a large fillet line 30a having processing machines 100 configured to process large fish, a medium fillet line 30b having processing machines 100 configured to process medium size fish, and small fillet line 30c having processing machines 101 configured to fillet small fish.

Each processing machine 100 and/or 101 can also include a recovery apparatus 110. In a typical application, a recovery apparatus 100 is attached to each of the processing machines 100 in the large and medium fillet lines 30a and 30b. The recovery apparatus 110 can also be attached to the processing machines 101 in the small fillet line 30c, or any combination of the fillet lines 30a–30c. The recovery apparatus 110 reclaims meat for surimi or other high-value products from conventional waste products that are typically used to produce fish meal. The recovery apparatus 110, for example, can be configured to reclaim significant volumes of meat from the heads or other waste body parts that have been severed from the fish trunks.

Figure 2:
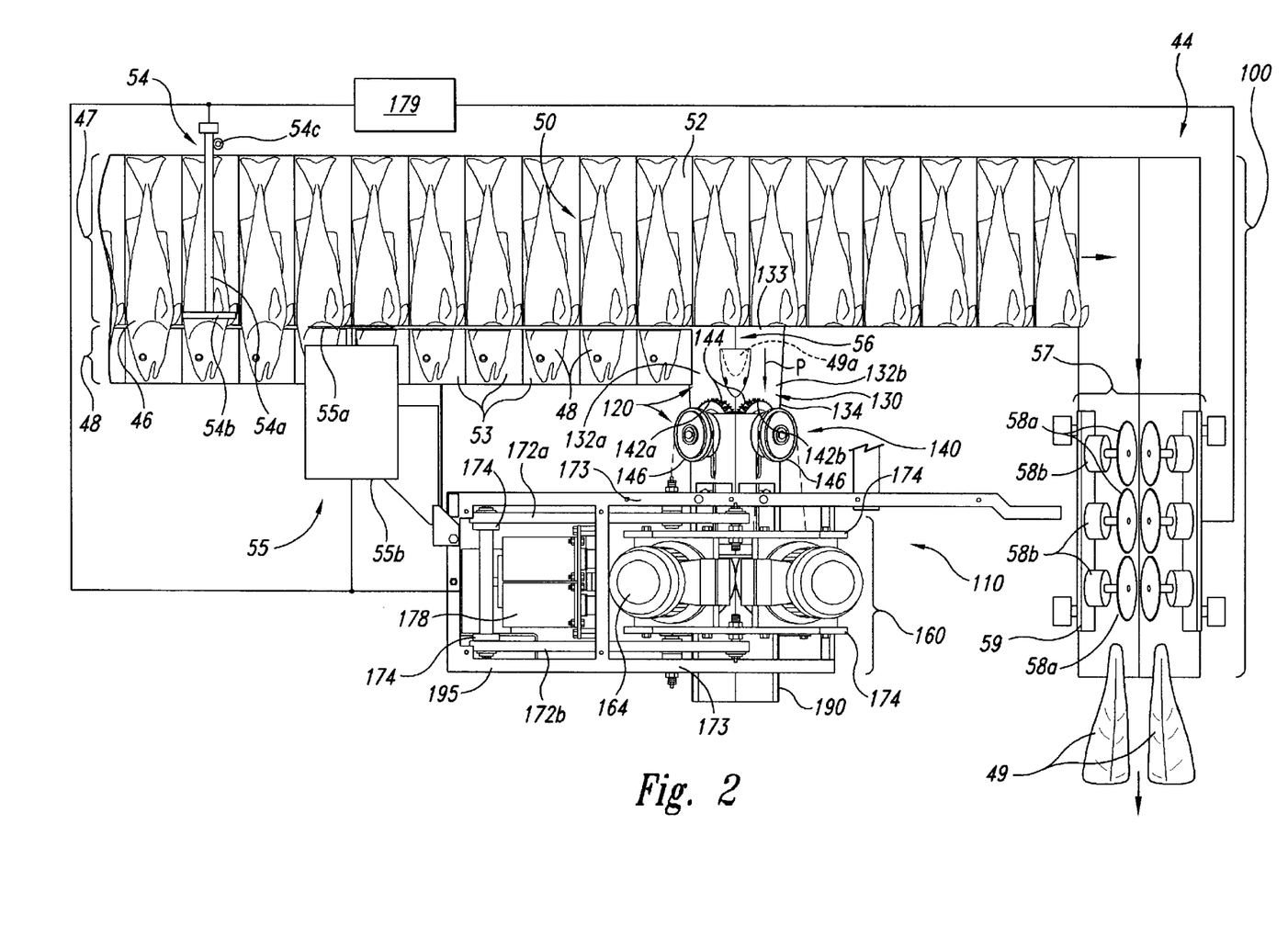
FIG. 2 is a top plan view of a fish processing machine including a recovery apparatus in accordance with an embodiment of the invention.

FIG. 2 is a top plan view of one embodiment of the fish processing machine 100 having a fillet processing machine 44 and the recovery apparatus 110 coupled to the fillet machine 44. The processing machine 100 processes a fish 46 to extract high-value fillet and surimi meat from both a trunk portion 47 and a head portion 48. The fillet machine 44, for example, can include a conveyor system 50 having a plurality of primary compartments 52 to carry the trunk portions 47 and corresponding secondary compartments 53 to carry the heads 48. The fillet machine 44 can also include a size sensor 54 that measures the size of each fish 46. The size sensor 54, for example, can include a pivoting lever 54a, a wheel 54b attached to one portion of the lever 54a, and a linear displacement device 54c attached to another portion of the lever 54a. The wheel 54b rotates over the fish 46 causing the lever arm 54a to pivot about a pivoting point, and the linear displacement device 54c senses the angular displacement of the lever 54a to determine the thickness of each fish 46. The overall size of a fish 46 is proportional to its thickness, and thus the size sensor 54 can generate a signal corresponding to the relative size of each fish 46. The size sensor 54 is operatively coupled to a controller 179 that processes the size signal to operate other mechanisms of the fillet machine 44 and the recovery apparatus 110. Suitable size sensors 54 and controllers 179 are used in the Baader 212 Food Processing Machines manufactured by Nordischer Maschinenbau Rud. Baader GmbH+Co. KG.

The fillet machine 44 can further include a head separator 55 downstream from the size sensor 54 and a fillet cutting assembly 57 downstream from the head separator 55. The head separator 55 generally includes a circular blade 55a coupled to a motor 55b that rotates the blade 55a. The head separator 55 accordingly severs the heads 48 from the trunks 47 so that the primary compartments 52 carry the trunks 47 to the fillet cutting assembly 57 and the secondary compartments 53 carry the severed heads 48 to a disposal site 56.

The fillet cutting assembly 57 typically has a plurality of circular cutting blades or knives 58a that are coupled to drive motors 58b, and an adjustment assembly 59 to adjust the spacing between the knives 58 according to the size of the fish 46 measured by the size sensor 54. The trunks 47 are then passed axially through the fillet cutting assembly 57 to slice fillets 49 from the trunks 47. The controller 179 is operatively coupled to the adjustment assembly 59 to move the cutting blades 58a toward/away from a processing axis through the fillet cutting assembly 57 according to the size of the fish 46 measured by the size sensor. Suitable fillet machines 44 with fillet cutting assemblies 57 are manufactured by Baader GmbH or Toyo Corporation.

The recovery apparatus 110 can be coupled to the fillet machine 44 at the disposal site 56 to automatically extract an additional meat portion 49a from each head 48 for use in high-value products. In this embodiment, the recovery apparatus 110 includes an automatic loading system 120 and a recovery cutter 160. The automatic loading system 120 automatically orients the additional meat portions 49a of the heads 48 in a cutting zone and transfers the heads 48 to the recovery cutter 160 without manually manipulating the heads 48. The recovery cutter 160 selectively cuts the additional meat portions 49a from the severed heads 48. The additional meat portions 49a can then be sent to the surimi process line 32 (FIG. 1) to be processed into high-value surimi, and the remaining portion of the heads 48 can then be sent to the fish meal processing station 36 (FIG. 1) to be processed into fish meal. As explained in more detail below, the automatic loading system 120 and the recovery cutter 160 can have several different configurations to handle the high volume of fish 46 that are generally processed through the fillet machine 44 and to increase the yield of the additional meat portions 49a from each fish 46.

One particular embodiment of the automatic loading system 120 includes a transfer system 130 having first and second members 132a and 132b configured to engage a portion of the fish head 48 in a manner that orients the additional meat portion 49a to face upward. The transfer system 130 can have a first end 133 proximate to the disposal site 56 of the fillet machine 44 and a second end 134 downstream along a recovery processing path "P". The transfer system 130, for example, can be a V-shaped chute inclined downwardly from the first end 133 to the second end 134.

The automatic loading system 120 can further include a drive assembly 140 having a first belt 142a and a second belt 142b. The first and second belts 142a and 142b can have a plurality of spikes 144 to grip the heads 48 at the second end 134 of the transfer system 130. The first and second belts 142a and 142b are preferably wrapped around a plurality of rollers 146, and at least one of the rollers 146 for each belt 142a and 142b is driven to move the heads 48 along the recovery processing path P. The drive assembly 140 accordingly carries the heads 48 from the transfer system 130 to the recovery cutter 160.

Figure 3:
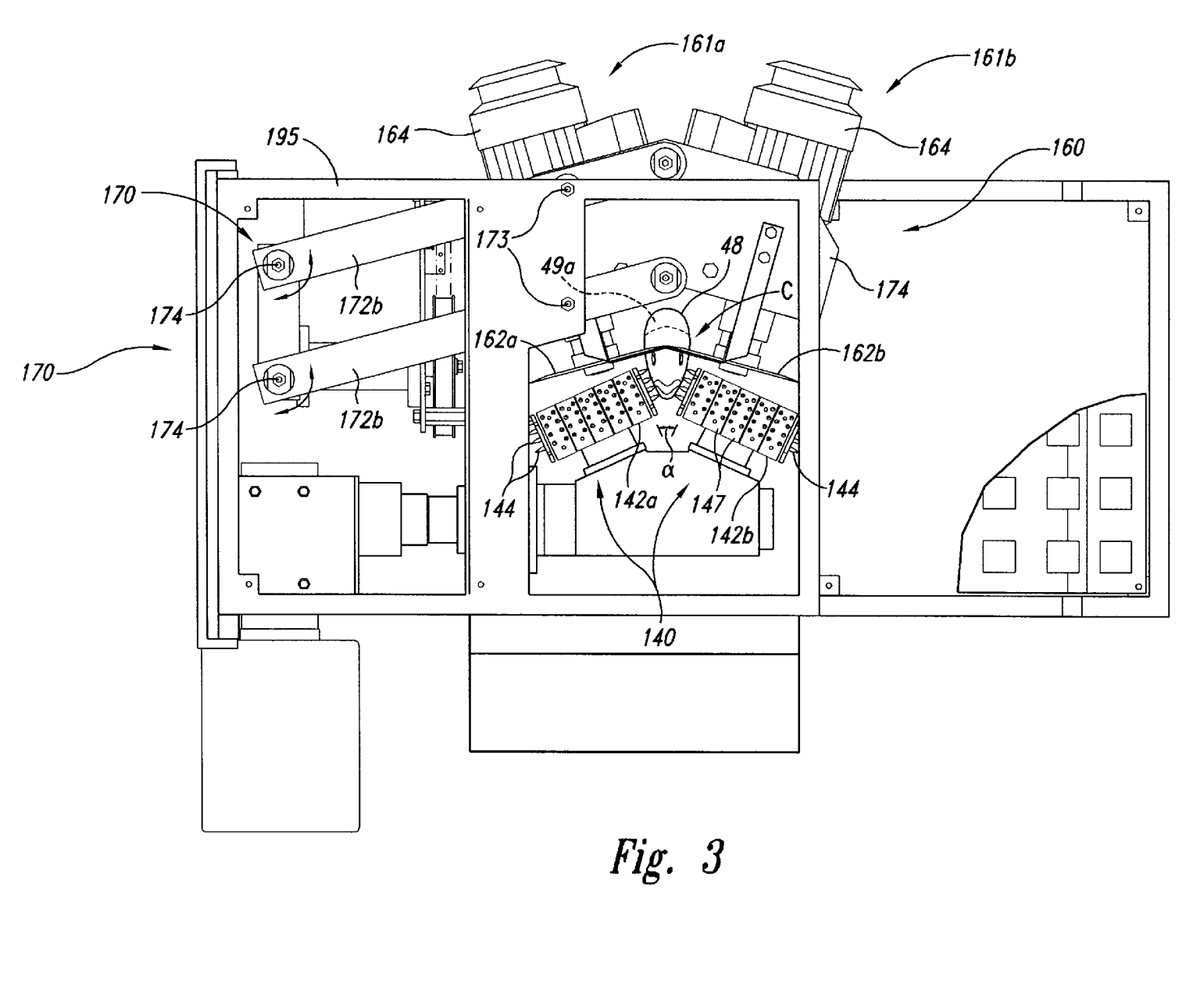
FIG. 3 is a front elevation view of the recovery apparatus shown in FIG. 2.

FIG. 3 is a front elevation view illustrating the drive assembly 140 and the recovery cutter 160 of this particular embodiment in greater detail. The first and second belts 142a and 142b can be inclined relative to each other at an angle α to hold the fish head 48 so that the additional meat portion 49a is positioned at a cutting zone "C" relative to the processing path P (FIG. 2). The cutting zone C, for example, is generally positioned to scalp a white meat portion from the head 48. The position of the recovery cutter 160 relative to the cutting zone C can vary according to the size and species of fish that are processed through the recovery cutter 160 to increase the yield of the additional meat portions 49a removed from the heads 48. The drive assembly 140 can have several other configurations, such as belts without spikes and/or belts that have individual sections 147 that are linked together by a cable or chain. It is also contemplated that chains, a series of wheels, or individual compartments can be substituted for the first and second belts 142a and 142b.

The recovery cutter 160 includes at least one knife or cutting blade positioned in the cutting zone C to sever the additional meat portion 49a from the head 48. The particular recovery cutter 160 illustrated in FIGS. 2 and 3 includes a first knife assembly 161a having a first cutting circular blade 162a, a second knife assembly 161b having a second circular cutting blade 162b, and a height adjustment assembly for selectively raising and lowering the first and second knife assemblies 161a and 161b according to the size of the heads 48. The first and second blades 162a and 162b are preferably positioned at an angle relative to each other to maximize the yield of additional meat portions 49a that are extracted from the heads 48. The apex of the angle between the first and second cutting blades 162a and 162b is preferably superimposed over the centerline of the angle $\updownarrow$ between the first and second belts 142a and 142b. The first and second blades 162a and 162b are coupled to motors 164 that rotate the blades to produce a clean slice in the cutting zone C. The blades 162a and 162b, and the motors 164, can be similar to the blades and motors used in the fillet machine 44.

The height adjustment assembly of the recovery cutter 160 can have several different configurations. Referring to FIGS. 2 and 3, the height adjustment assembly includes a pair of first arms 172a (FIG. 2), a pair of second arms 172b, and a plate or bracket 174 pivotally attached to each pair of the first and second arms 172a and 172b. The first and second arms 172a and 172b are pivotally attached to a housing or frame 195 of the recovery cutter 160 at pivot points 173. The height adjustment assembly further includes at least one step motor 178 (FIG. 1) operatively coupled to the controller 179 (FIG. 1) and the first and second arms 172a and 172b. The step motor 178, more specifically, can be coupled to the first and second arms 172a and 172b by pivoting joints 174. The controller 179 controls the step motor 178 to selectively pivot the first and second arms 172a and 172b for raising and lowering the bracket 174. The first and second knife assemblies 161a and 161b are attached to the bracket 174.

The height adjustment assembly raises/lowers the first and second knife assemblies 161a and 161b to position the first and second blades 162a and 162b at the appropriate height in the cutting zone C for the particular size of fish. The step motor 178, for example, receives a signal from the controller 179 corresponding to the size of a fish 46 sensed by the size sensor 54, and the step motor 178 rotates the first and second arms 172a and 172b about their respective pivot points 173 to raise/lower the first and second knife assemblies 161a and 161b according to the measured size of the fish 46. The controller 179 accordingly records the size of each fish, counts the location of each trunk 47 and head 48, and adjusts the fillet cutting assembly 57 and the recovery cutter 160 to enhance the amount of high quality meat extracted from each fish 46.

FIGS. 2 and 3 together best illustrate the operation of the fish processing machine 100. The fish 46 are initially placed on the primary conveyor system 50 so that the head separator 55 cuts the heads 48 from the trunks 47. The separated heads 48 are carried to the disposal site 56 by the secondary compartments 53. At the disposal site 56, the secondary compartments 53 roll downward to deposit the severed heads 48 at the first end 133 of the transfer system 130. The first end 133 of the transfer system 130 is accordingly positioned so that the heads 48 will drop onto the first and second members 132a and 132b with the additional meat portion 49a facing upward. When the transfer system 130 is a V-shaped chute that slopes downwardly from the first end 133, the head 48 slides down the V-shaped chute to a receiving end of the drive assembly 140. The spikes 144 on the first and second belts 142a and 142b grip the head 48 and move the head along the cutting path P so that the additional meat portion 49a is in the cutting zone C. The first and second blades 162a and 162b accordingly sever the additional meat portion 49a from the head 48. The severed additional meat portion 49a is deposited onto an output chute 190 (FIG. 2), and the remaining portion of the head 48 is transported to the fish meal processing station 36 (FIG. 1). The additional meat portion 49a is generally transported to the surimi processing line 32 (FIG. 1) to be processed into surimi.

Several embodiments of the fish processing machine 100 illustrated in FIGS. 2 and 3 are expected to increase the yield of fish meat for surimi or other high-value fish products. Conventional fish processing methods and equipment typically send the entire head 48 including the additional meat portion 49a to the fish meal processing station 36 (FIG. 1). The processing machine 100, however, separately processes the severed heads 48 in parallel with the trunks 47 to remove additional meat from the heads 48 that would otherwise be processed into fish meal in conventional systems. The additional meat portions 49a from the heads 48 is expected to increase the yield of high-value fish meat by 3 to 4 percent. Therefore, the fish processing machine 100 can effectively increase the yield of high-value fish products without increasing the tonnage of fish that is removed from the sea.

Several embodiments of the fish processing machine 100 illustrated in FIGS. 2 and 3 are also expected to enhance the yield of high-value fish meat compared to other processes and equipment that manually process the fish heads. As explained above, some fish processors have attempted to extract additional meat from the severed heads by manually feeding the heads into a cutting machine having a single, horizontal cutting blade. Such manual systems are inefficient because they cannot process the heads nearly as fast as the Baader and Toyo fillet machines can process the trunks (e.g., 120–150 trunks/minute). Moreover, it is expensive to house, feed, and pay for the additional personnel to manually feed fish heads through a single blade cutting machine. The processing machine 100, however, automatically transports the severed fish heads from the filleting machine 44 through the recovery cutter 160 at a throughput that matches the processing rates of the filleting machine 44. The embodiments of the processing machine 100 shown in FIGS. 2 and 3, therefore, not only allows the filleting machines 44 to operate at full capacity, but they do not require additional personnel to recover the additional meat portions 49a from the heads 48.

Additionally, several embodiments of the processing machine 100 shown in FIGS. 2 and 3 are expected to enhance the yield of recovered fish meat compared to conventional manually operated single-blade recovery devices. The height adjustment assembly and the angle between the first and second blades 162a and 162b (FIG. 3) increase the amount of meat in the additional meat portions 49a that are severed from the heads 48 compared to recovery systems that have a single, horizontal blade at a fixed height. By raising/lowering the first and second knife assemblies 161a and 161b, the position of the blades in the cutting zone C can be adjusted to engage the fish head 48 at a point where the maximum amount of additional meat 49a can be cut without also cutting bones, eyes or other waste portions of the head 48. Additionally, by canting the first the second blades 162a and 162b at an angle ↕, the additional meat portion 49a can include the meat on the side portions of the head 48. Therefore, several embodiments of the processing machine 100 shown in FIGS. 2 and 3 are expected to increase the yield of the additional meat portions 49a compared to conventional equipment.

Figure 4:
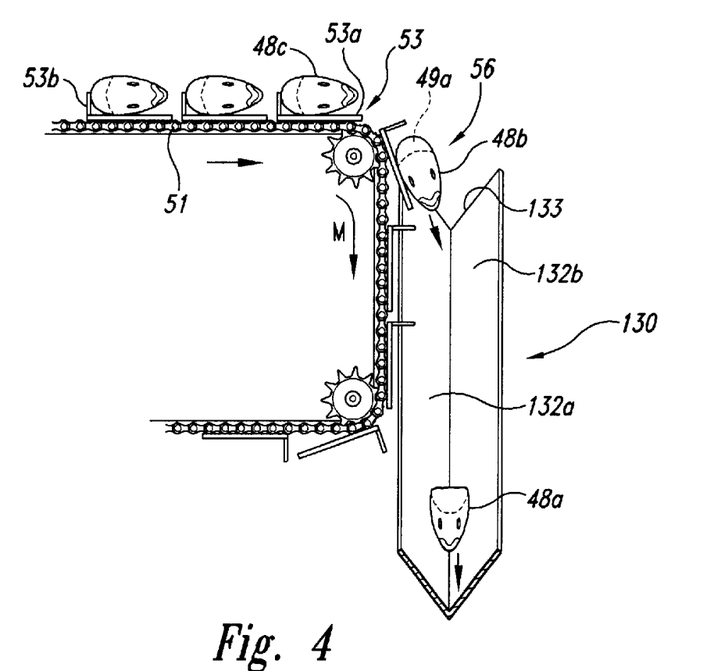
FIG. 4 is a front cross-sectional view of a transfer mechanism for a recovery apparatus in accordance with an embodiment of the invention.

FIG. 4 is a cross-sectional view partially illustrating an embodiment of the transfer system 130 taken along line 4—4 of FIG. 2. In this embodiment, the transfer system 130 is a V-shaped transfer chute in which the first member 132a is one side of the chute and the second member 132b is an opposing side of the chute. The first end 133 of the chute is positioned below the disposal site 56 of the fillet machine 44 (FIG. 2). FIG. 4 also further illustrates the secondary compartments 53 of the primary conveyor system 50 of the fillet machine 44. Each secondary compartment 53 has a plate 53a and a fence 53b at one end of the plate 53a. Each plate 53a is attached to a chain 51 that moves along the fillet machine 44 (arrow "M"). A first head 48a has already been deposited at the first end 133 of the V-shaped chute and is sliding downward toward the drive assembly 140 (FIG. 2). A second head 48b is shown sliding off of a secondary compartment 53 and onto the first end 133 of the V-shaped chute. The first and second sides 132a and 132b orient the head 48b so that the additional meat portion 49a of the second head 48b faces upward. The second head 48b will then slide down the chute to the drive assembly 140, and a third head 48c will follow the second head 48b onto the first end 133 of the chute. The transfer system 130 accordingly orients the head portions 49a so that they can be severed from the heads 48 by the first and second blades 162a and 162b of the cutter assembly 160 (FIG. 3). The transfer system 130 also automatically delivers the severed heads 48 to the drive assembly 140 without manually manipulating the heads 48. In an alternate embodiment, the transfer system 130 can be configured to deliver the heads 48 directly to the recovery cutter 160 without the drive assembly 140.

Figure 5:
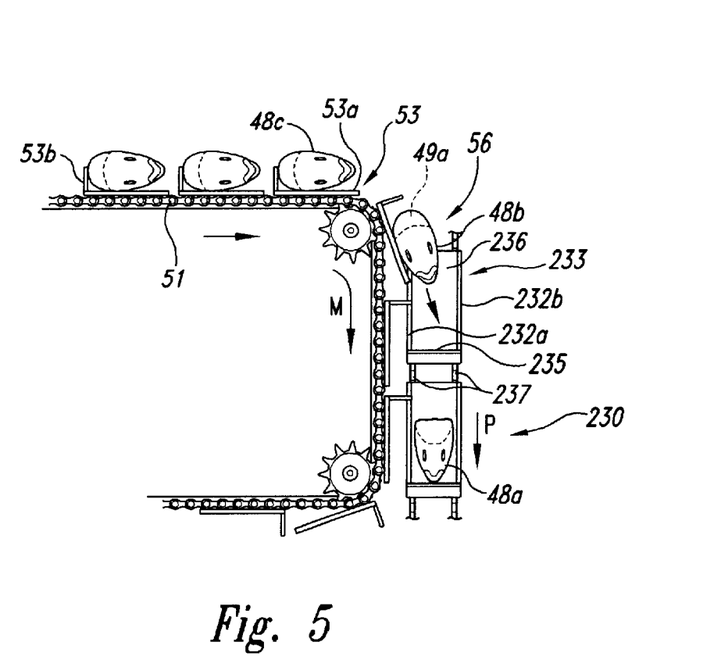
FIG. 5 is a front elevation view of another transfer mechanism for a recovery apparatus in accordance with an embodiment of the invention.

FIG. 5 is a front elevational view partially illustrating another transfer system 230 for the processing machine 100 in accordance with another embodiment of the invention. The transfer system 230 includes first and second members 232a and 232b defined by side walls of a discrete compartment 233. Each discrete compartment 233 also includes a front wall 235 and a floor 236. The transfer system 230 further includes a conveyor chain 237 or cable attached to each of the compartments 233 to make a secondary conveyor system having a train of compartments 233. The compartments 233 move along the processing path P such that a first head 48a is positioned in one compartment 233 as a second head 48b is dropped into the following compartment 233. The side walls 232a and 232b accordingly define the first and second members of the transfer system 230 that orient the heads 48 so that the additional meat portions 49a are positioned in the cutting zone. The transfer system 230 can extend under the first and second blades 162a and 162b (FIG. 3) along the processing path P to replace the drive assembly 140 with the transfer system 230. The front wall 235 and the side walls 232a and 232b accordingly have heights that are less than the elevation of the cutting zone C so that the recovery cutter 160 (FIG. 3) does not contact the compartments 233.

Figure 6:
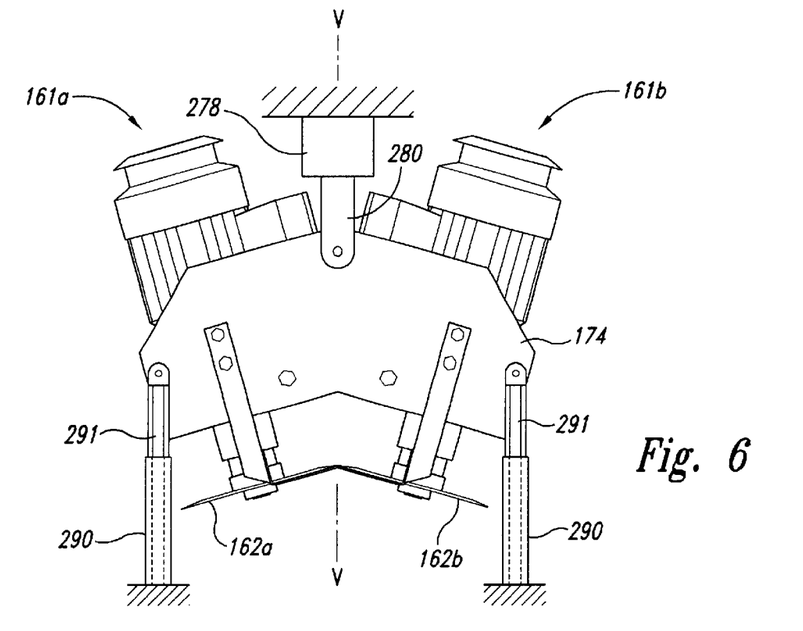
FIG. 6 is a partial front elevation view of a height adjusting assembly for a recovery apparatus in accordance with an embodiment of the invention.
Figure 7:
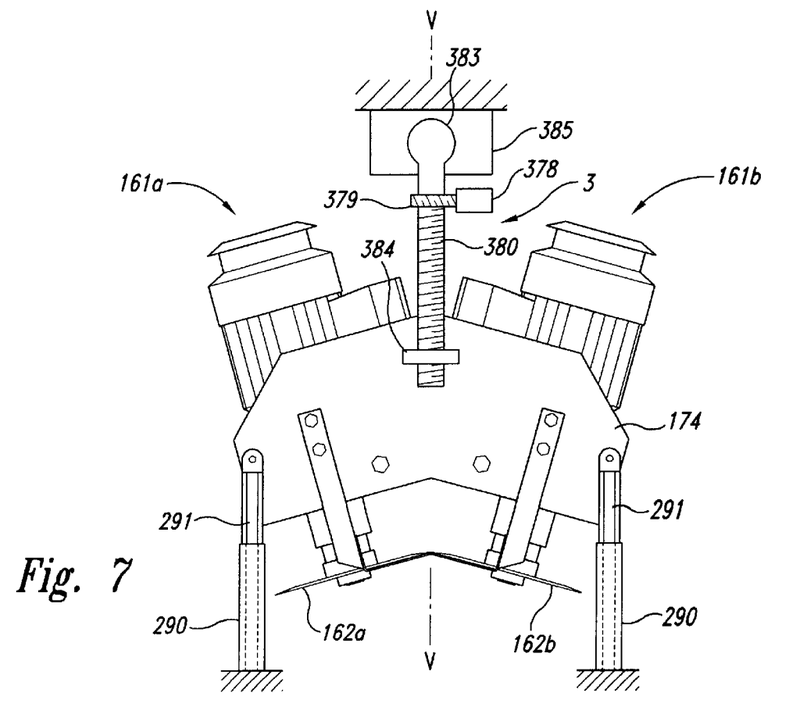
FIG. 7 is a partial front elevation view of another height adjusting assembly for a recovery apparatus in accordance with another embodiment of the invention.

FIGS. 6 and 7 illustrate additional embodiments of the height adjustment assembly for adjusting the height of the first and second knives 161a and 161b. Referring to FIG. 6, the height adjustment assembly includes an actuator 278 having a rod 280 attached to the bracket 174. The actuator 278 can be fixed to the housing 195 (FIG. 3) or another structure of the recovery cutter 160. The height adjustment assembly can further include a plurality of passive linear guides 290 having telescoping rails 291 attached to the bracket 174 and another portion of the recovery cutter 160. The linear guides 290 restrict movement of the bracket 174 along a height adjusting axis V. The actuator 278 accordingly extends or retracts the rod 280 to move the bracket 174 up or down. The actuator 278 can accordingly be coupled to the controller 179 (FIG. 2) to accurately raise/lower the blades 162a and 162b according to the size of the fish passing through the recovery cutter 160. The actuator 278 can be a hydraulic motor and cylinder that moves the rod 280 linearly according to the oil pressure generated by the hydraulic motor, or the actuator 278 can be other types of linear displacement devices (e.g., a step motor coupled to a rack-and-pinion mechanism).

FIG. 7 illustrates another height adjusting assembly having an actuator 378, a worm gear 379 coupled to the actuator 378, and a ball screw 380 having a ring gear (not shown) engaging the worm gear 379. The ball screw 380 has a ball 383 received in a fixed socket 385 attached to the housing 195 (FIG. 3). The threaded portion of the ball screw 380 engages a nut 384 attached to the bracket 174. In operation, the actuator 378 rotates the worm gear 379 to rotate the ball screw 380 via the ring gear (not shown). The threaded engagement between the ball screw 380 and the nut 384 moves the nut 384 axially along the ball screw 380 to raise/lower the bracket 174. The actuator 378 can also be coupled to the controller 179 (FIG. 2) to rotate the worm gear 379 for raising/lowering the bracket 174 according to the size of the fish passing through the recovery cutter.

From the foregoing, it will be appreciated that although specific embodiments of the processing system have been described for purposes of illustration, various modifications may be made without deviating from the spirit and the scope of the invention. Accordingly, the invention is not limited except by the appended claims.

What is claimed is:

1. A fish processing machine, comprising:
a filleting assembly having a conveyor system to transport a trunk of a fish, a fish size sensor to determine the size of each fish and generate a signal corresponding to the size of each fish, a head separator to separate a head portion of the fish from the trunk, a head disposal site, and a fillet cutting assembly having at least one fillet knife arranged to slice a fillet of meat from the trunk;
a recovery apparatus adjacent to a section of the filleting assembly, the recovery apparatus having an automatic loading system and a recovery cutter, wherein the automatic loading system includes first and second members extending along a recovery processing path, the first member having first surface configured to engage a first portion of the head and the second member having a second surface configured to engage a second portion of the head in a manner that orients a meat portion of the head in a cutting zone relative to the recovery processing path, and wherein the recovery cutter includes first and second moveable cutting blades at the cutting location relative to the recovery processing path to cut the meat portion from the head, the cutting blades being at an angle greater than zero with respect to one, and a position actuator coupled to the first and second cutting blades to change the position of the cutting blades; and a controller operatively coupled to the position actuator and the size sensor, wherein the controller sends command signals to the position actuator to automatically position the first and second cutting blades in correspondence to the size signals.

2. The processing machine of claim 1 wherein:

the automatic loading system comprises a V-shaped transfer chute including a first side defining the first member and a second side defining the second member, and a belt drive assembly including first and second belts arranged at an angle to each other to define a V-shape, the transfer chute having a first end connected to the filleting assembly at the head disposal site and a second end inclined downwardly from the first end, and the belt drive assembly having a receiving end at the second end of the transfer chute and a delivery end proximate to the cutting blade of the recovery cutter, wherein the V-shaped transfer chute orients the meat portion of the head upwardly; and the recovery cutter comprises a first knife assembly having a first motor and a first circular cutting blade, a second knife assembly having a second motor and a second circular cutting blade at an angle to the first cutting blade, and a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket, the first and second knife assemblies being attached to the bracket.

3. The processing machine of claim 1 wherein:

the filleting assembly further comprises a fish size sensor that generates a signal corresponding to a size of the fish;

the automatic loading system comprises a V-shaped transfer chute including a first side defining the first member and a second side defining the second member and a belt drive assembly including first and second belts arranged at an angle to each other to define a V-shape, the transfer chute having a first end connected to the filleting assembly at the head disposal site and a second end inclined downwardly from the first end, and the belt drive assembly having a receiving end at the second end of the transfer chute and a delivery end proximate to the cutting blade of the recovery cutter, wherein the V-shaped transfer chute orients the meat portion of the head upwardly; and the recovery cutter comprises a first knife assembly having a first motor and a first circular cutting blade, a second knife assembly having a second motor and a second circular cutting blade at an angle to the first cutting blade, and a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket, the first and second knife assemblies being attached to the bracket.

4. The processing machine of claim 1 wherein the automatic loading system comprises a V-shaped transfer chute including a first side defining the first member, a second side defining the second member, a first end connected to the filleting assembly at the head disposal site, and a second end inclined downwardly from the first end, wherein the first end of the transfer chute is below the disposal site so that the head drops into the V-shaped transfer chute and the meat portion of the head faces upward.

5. The processing machine of claim 1 wherein the automatic loading system comprises a conveyor track having a plurality of discrete compartments with a base, a first sidewall defining the first member, a second side wall defining the second member, and an end sidewall wall transverse to the side walls.

6. The processing machine of claim 1 wherein the automatic loading system comprises a transfer chute and a spiked belt drive assembly, the transfer chute having a first end at the head disposal site and a second end inclined downwardly from the first end, and the spiked belt drive assembly having a receiving end at the second end of the transfer chute and a delivery end at the recovery cutter.

7. The processing machine of claim 1 wherein the recovery cutter includes a first knife assembly having a first motor and a first circular cutting blade, and a second knife assembly having a second motor and a second circular cutting blade at an angle to the first circular cutting blade.

8. The processing machine of claim 1 wherein the recovery cutter includes a first knife assembly having a first motor and a first circular cutting blade and a second knife assembly having a second motor and a second cutting blade at an oblique angle with respect to the first circular cutting blade.

9. The processing machine of claim 1 wherein the recovery cutter comprises a first knife assembly having a first motor and a first circular cutting blade, a second knife assembly having a second motor and a second circular cutting blade at an angle to the first circular cutting blade, and a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket and the first and second arms, the first and second knife assemblies being attached to the bracket.

10. The processing machine of claim 1 wherein:

the filleting assembly further comprises a fish size sensor that generates a signal corresponding to a size of the fish; and the recovery cutter comprises a first knife assembly having a first motor and a first circular cutting blade, a second knife assembly having a second motor and a second circular cutting blade at an angle to the first cutting blade, and a height adjustment assembly attached to the first and a second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket, the first and second knife assemblies being attached to the bracket.

11. The processing machine of claim 1 wherein the recovery cutter comprises a first knife assembly having a first motor and a first circular cutting blade, a second knife assembly having a second motor and a second circular cutting blade at an angle to the first cutting blade, and a height adjustment assembly attached to the first and second knife assemblies, the height adjustment assembly including a bracket and an actuator, the bracket having a first section attached to the first knife assembly and a second section attached to the second knife assembly, and the actuator being coupled to the bracket for selectively raising and lowering the bracket to position the first and second cutting blades at a desired elevation in the cutting zone.

12. The processing machine of claim 1 wherein the recovery cutter comprises a first knife assembly having a first motor and a first circular cutting blade, a second knife assembly having a second motor and a second circular cutting blade at an angle to the first cutting blade, and a height adjustment assembly attached to the first and second knife assemblies, the height adjustment assembly including a bracket and an actuator, the bracket having a first section attached to the first knife assembly and a second section attached to the second knife assembly, and the actuator being a hydraulic actuator coupled to the bracket for selectively raising and lowering the bracket to position the first and second cutting blades at a desired elevation in the cutting zone.

13. The processing machine of claim 1 wherein the recovery cutter comprises a first knife assembly having a first motor and a first circular cutting blade, a second knife assembly having a second motor and a second circular cutting blade at an angle to the first cutting blade, and a height adjustment assembly attached to the first and second knife assemblies, the height adjustment assembly including a step motor, a ball screw coupled to the step motor, a nut threadedly coupled to the ball screw, and a bracket attached to the nut, the bracket having a first section attached to the first knife assembly and a second section attached to the second knife assembly, the step motor rotating the ball screw to raise and lower the bracket along a path defined by a longitudinal axis of the ball screw.

14. A fish processing machine, comprising:
a primary processing line including a first conveyor system to transport a fish trunk along a primary processing path, a fish size sensor to determine the size of each fish and generate a signal corresponding to the size of each fish, a first cutter at a first location along the primary processing path configured to separate a waste body part from the fish trunk, and a second cutter at a second location along the primary processing path downstream from the first cutter, the second cutter having at least one knife arranged to slice meat from the trunk;
a reclamation processing line coupled to the primary processing line, the reclamation processing line including a recovery cutter to separate an additional meat portion from the waste body part and a transfer mechanism to automatically transport the waste body part to the recovery cutter without manually manipulating the waste body part, wherein the recovery cutter comprises first and second moveable cutting blades in a cutting zone relative to a reclamation processing path to slice the additional meat portion from the waste body part, and a position actuator coupled to the first and second cutting blades to change the position of the cutting blades, and wherein the transfer mechanism comprises a receiving station proximate to the first location of primary processing line to receive the separated waste body part, a support surface configured to orient the separated waste body part so that the additional meat portion is in the cutting zone and a delivery station proximate to the first and second cutting blades of the recovery cutter; and a controller operatively coupled to the position actuator and the size sensor, wherein the controller sends command signals to the position actuator to automatically position the first and second cutting blades in correspondence to the size signals.

15. The processing machine of claim 14 wherein:
the primary processing line is a filleting assembly comprising a fish size sensor that generates a signal corresponding to a size of the fish;
the transfer mechanism is an automatic loading system comprising a V-shaped transfer chute including a first side defining the first member and a second side defining the second member and a belt drive assembly including first and second belts arranged at an angle to each other to define a V-shape, the transfer chute having a first end connected to the filleting assembly at the head disposal site and a second end inclined downwardly from the first end, and the belt drive assembly having a receiving end at the second end of the transfer chute and a delivery end proximate to the cutting blade of the recovery cutter, wherein the V-shaped transfer chute orients the meat portion of the head upwardly; and
the recovery cutter comprises a first knife assembly having a first motor and the first cutting blade, a second knife assembly having a second motor and a second cutting blade at an angle to the first cutting blade, and a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket, the first and second knife assemblies being attached to the bracket.

16. The processing machine of claim 14 wherein the transfer mechanism is an automatic loading system comprising a V-shaped transfer chute including a first side, a second side, a first end defining the receiving station connected to the filleting assembly at the head disposal site, and a second end inclined downwardly from the first end defining the delivery station, wherein the first end of the transfer chute is below the disposal site so that the head drops into the V-shaped transfer chute and the meat portion of the head faces upward.

17. The processing machine of claim 14 wherein the transfer mechanism is an automatic loading system comprising a transfer chute and a spiked belt drive assembly, the transfer chute having a first end at the head disposal site defining the receiving station and a second end inclined downwardly from the first end, and the spiked belt drive assembly having a receiving end at the second end of the transfer chute and a delivery end at the recovery cutter defining the delivery station.

18. The processing machine of claim 14 wherein the recovery cutter includes a first knife assembly having a first motor and a first circular cutting blade, and a second knife assembly having a second motor and a second circular cutting blade at an angle to the first circular cutting blade.

19. The processing machine of claim 14 wherein the recovery cutter comprises a first knife assembly having a first motor and a first circular cutting blade, a second knife assembly having a second motor and a second circular cutting blade at an angle to the first circular cutting blade, and a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket and the first and second arms, the first and second knife assemblies being attached to the bracket.

20. A fish meat recovery machine, comprising:
   a waste product transfer mechanism separate from a filleting machine to receive a head portion of a fish that has been separated from a trunk portion of the fish, the transfer mechanism having a receiving station that orients a meat portion of the head to face upward in a cutting zone with respect to a processing path; and
   a cutting assembly coupled to the transfer mechanism, the cutting assembly having a first knife assembly with a first cutting blade and a second knife assembly with a second blade at an angle with respect to the first blade in the cutting zone to sever the meat portion from the head, a position actuator coupled to the first and second cutting blades to change the position of the cutting blades, and a controller operatively coupled to the position actuator and the size sensor, wherein the controller sends command signals to the position actuator to position the first and second cutting blades in correspondence to the size signals.

21. A fish meat recovery machine, comprising:
   a waste product transfer mechanism separate from a filleting machine to receive a waste body part of a fish that has been separated from a trunk portion of the fish, the transfer mechanism having a receiving station that orients a meat portion of the waste body part in a cutting zone with respect to a processing path;
   a cutting assembly coupled to the transfer mechanism, the cutting assembly having a first knife assembly with a first cutting blade and a second knife assembly with a second blade at an angle with respect to the first blade in the cutting zone to sever the meat portion from the waste body part;
   wherein the transfer mechanism comprises a V-shaped transfer chute including a first side and a second side, and a belt drive assembly including first and second belts arranged at an angle to each other to define a V-shape, the transfer chute having a first end defining the receiving station and a second end inclined downwardly from the first end, and the belt drive assembly having a receiving end at the second end of the transfer chute and a delivery end proximate to the first and second cutting blades, wherein the V-shaped transfer chute orients the meat portion upwardly; and
   wherein the cutting assembly further comprises a height adjustment assembly attached to the first and second knife assemblies, the height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket, the first and second knife assemblies being attached to the bracket.

22. The processing machine of claim 20 wherein the transfer mechanism comprises a V-shaped transfer chute including a first end and a second end inclined downwardly from the first end.

23. The processing machine of claim 20 wherein the transfer mechanism comprises a transfer chute and a spiked belt drive assembly, the transfer chute having a first end and a second end inclined downwardly from the first end, and the spiked belt drive assembly having a receiving end at the second end of the transfer chute and a delivery end at the cutting assembly.

24. A fish meat recovery machine, comprising:
   a waste product transfer mechanism separate from a filleting machine to receive a waste body part of a fish that has been separated from a trunk portion of the fish, the transfer mechanism having a receiving station that orients a meat portion of the waste body part in a cutting zone with respect to a processing path;
   a cutting assembly coupled to the transfer mechanism, the cutting assembly having a first knife assembly with a first cutting blade and a second knife assembly with a second blade at an angle with respect to the first blade in the cutting zone to sever the meat portion from the waste body part; and
   wherein the cutting assembly further comprises a height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket and the first and second arms, the first and second knife assemblies being attached to the bracket.

25. A fish meat recovery machine, comprising:
   a waste product transfer mechanism separate from a filleting machine to receive a waste body part of a fish that has been separated from a trunk portion of the fish, the transfer mechanism having a receiving station that orients a meat portion of the waste body part in a cutting zone with respect to a processing path;
   a cutting assembly coupled to the transfer mechanism, the cutting assembly having a first knife assembly with a first cutting blade and a second knife assembly with a second blade at an angle with respect to the first blade in the cutting zone to sever the meat portion from the waste body part; and
   wherein the cutting assembly further comprises a height adjustment assembly attached to the first and second knife assemblies, the height adjustment assembly including a bracket having a first section attached to the first knife assembly and a second section attached to the second knife assembly, and an actuator coupled to the bracket for selectively raising and lowering the bracket to position first and second cutting blades at a desired elevation in the cutting zone.

26. A fish meat recovery machine, comprising:
   a waste product transfer mechanism separate from a filleting machine to receive a waste body part of a fish that has been separated from a trunk portion of the fish, the transfer mechanism having a receiving station that orients a meat portion of the waste body part in a cutting zone with respect to a processing path;
   a cutting assembly coupled to the transfer mechanism, the cutting assembly having a first knife assembly with a first cutting blade and a second knife assembly with a second blade at an angle with respect to the first blade in the cutting zone to sever the meat portion from the waste body part; and
   wherein the cutting assembly further comprises a height adjustment assembly attached to the first and second knife assemblies, the height adjustment assembly including a bracket having a first section attached to the first knife assembly and a second section attached to the second knife assembly, and hydraulic actuator coupled to the bracket for selectively raising and lowering the bracket to position the first and second cutting blades at a desired elevation in the cutting zone.

27. A fish meat recovery machine, comprising:

a waste product transfer mechanism separate from a filleting machine to receive a waste body part of a fish that has been separated from a trunk portion of the fish, the transfer mechanism having a receiving station that orients a meat portion of the waste body part in a cutting zone with respect to a processing path;

a cutting assembly coupled to the transfer mechanism, the cutting assembly having a first knife assembly with a first cutting blade and a second knife assembly with a second blade at an angle with respect to the first blade in the cutting zone to sever the meat portion from the waste body part; and wherein the cutting assembly further comprises a height adjustment assembly attached to the first and second knife assemblies, the height adjustment assembly including a step motor, a ball screw coupled to the step motor, a nut threadedly coupled to the ball screw, and a bracket attached to the nut, the bracket having a first section attached to the first knife assembly and a second section attached to the second knife assembly, the step motor rotating the ball screw to raise and lower the bracket along a path defined by a longitudinal axis of the ball screw.

28. A method of processing meat on a waste body part of a fish comprising:

separating a trunk portion of a fish for processing in a primary process line from a head portion of the fish;

transferring the head from the primary processing line to a reclamation processing line automatically without manually manipulating the head so that a meat portion of the head is oriented upwardly; and separating an additional meat portion from the upward facing head along at least two planes intersecting at an angle.

29. The method of claim 28 wherein transferring the waste body part comprises mechanically placing the body part on an automatic loading system comprising a V-shaped transfer chute including a first side, a second side, a first end connected to the primary process line, and a second end inclined downwardly from the first end, wherein the first end of the transfer chute is below the primary process line so that the head drops into the V-shaped transfer chute and the meat portion of the head faces upward.

30. The method of claim 28 wherein transferring the waste body part comprises sliding the waste body part down a transfer chute to a spiked belt drive assembly, and carrying the waste body part on the spiked belt drive assembly to a recovery cutter.

31. The method of claim 28 wherein separating the meat portion from the waste body part comprises cutting the meat portion with a first knife assembly having a first motor and a first circular cutting blade in a first plane, and a second knife assembly having a second motor and a second circular cutting blade in a second plane at an angle to the first circular cutting blade.

32. A method of processing meat on a waste body part of a fish comprising:

separating a trunk portion of a fish for processing in a primary process line from a waste body part of the fish;

transferring the waste body part from the primary processing line to a reclamation processing line automatically without manually manipulating the waste body part; and separating an additional meat portion from the waste body part along at least two planes intersecting at an angle, wherein separating the additional meat portion from the waste body part comprises adjusting the height of a first cutting blade and a second cutting blade relative to a cutting zone according to a measured size of the fish.

33. A method of processing meat on a waste body part of a fish comprising:

separating a trunk portion of a fish for processing in a primary process line from a waste body part of the fish;

transferring the waste body part from the primary processing line to a reclamation processing line so that an additional meat portion of the separated waste body part is in a cutting zone relative to the processing path and moving the waste body part along the processing path so that the meat portion of the head is oriented upwardly; and engaging the additional meat portion with first and second knives positioned in the cutting zone as the waste body part moves along the processing path.

34. A method of processing meat on a waste body part of a fish comprising:

separating a trunk portion of a fish for processing in a primary process line from a waste body part of the fish;

transferring the waste body part from the primary processing line to a reclamation processing line automatically without manually manipulating the waste body part so that the meat portion of the head is oriented upwardly;

adjusting a position of a cutting blade in a cutting zone according to a measured size of the fish; and separating an additional meat portion from the waste body part by engaging the waste body part with the cutting blade.

35. The method of claim 34 wherein transferring the waste body part comprises mechanically placing the body part on an automatic loading system comprising a V-shaped transfer chute including a first side, a second side, a first end connected to the primary process line, and a second end inclined downwardly from the first end, wherein the first end of the transfer chute is below the primary process line so that the head drops into the V-shaped transfer chute and the meat portion of the head faces upward.

36. The method of claim 34 wherein transferring the waste body part comprises sliding the waste body part down a transfer chute to a spiked belt drive assembly, and carrying the waste body part on the spiked belt drive assembly to a recovery cutter.

37. The method of claim 34 wherein separating the meat portion from the waste body part comprises cutting the meat portion with a first knife assembly having a first motor and a first circular cutting blade, and a second knife assembly having a second motor and a second circular cutting blade at an angle to the first circular cutting blade.

38. The method of claim 34 wherein adjusting the position of the cutting blade comprises adjusting the height of first and second cutting blades with a height adjustment assembly including a first arm pivotally attached to a frame, a second arm pivotally attached to the frame, a bracket attached to the first and second arms, and a step motor coupled to the first and/or the second arm to pivot the first and second arms about the frame for selectively raising and lowering the bracket and the first and second arms, the first cutting blade being a component of a first knife assembly attached to one section of the bracket and the second cutting blade being a component of a second knife assembly attached to another section of the bracket.

* * * * *